(12) United States Patent
Henmi et al.

(10) Patent No.: US 10,344,865 B2
(45) Date of Patent: Jul. 9, 2019

(54) SEALING DEVICE

(71) Applicant: NOK CORPORATION, Tokyo (JP)

(72) Inventors: Kota Henmi, Aso (JP); Makoto Hatano, Aso (JP); Shuji Yoshitsune, Aso (JP)

(73) Assignee: NOK Corporation (JP)

( * ) Notice: Subject to any disclaimer, the term of this patent is extended or adjusted under 35 U.S.C. 154(b) by 395 days.

(21) Appl. No.: 15/117,928

(22) PCT Filed: Mar. 6, 2015

(86) PCT No.: PCT/JP2015/056600
§ 371 (c)(1),
(2) Date: Aug. 10, 2016

(87) PCT Pub. No.: WO2015/133595
PCT Pub. Date: Sep. 11, 2015

(65) Prior Publication Data
US 2016/0356381 A1    Dec. 8, 2016

(30) Foreign Application Priority Data

Mar. 6, 2015  (JP) .................. 2014-043578

(51) Int. Cl.
*F16J 15/32* (2016.01)
*F16J 15/16* (2006.01)
(Continued)

(52) U.S. Cl.
CPC .......... *F16J 15/166* (2013.01); *F02M 55/004* (2013.01); *F16J 15/26* (2013.01); *F16J 15/3216* (2013.01); *F16J 15/3224* (2013.01)

(58) Field of Classification Search
CPC ............. F16J 15/166; F16J 15/56; F16J 15/32
See application file for complete search history.

(56) References Cited

U.S. PATENT DOCUMENTS 3,718,338 A * 2/1973 Traub ...................... F16J 15/56
277/584
4,034,993 A * 7/1977 Okada ................... F16J 15/166
277/611
(Continued)

FOREIGN PATENT DOCUMENTS

CN   101358652 A   2/2009
JP   H1068467 A    3/1998
(Continued)

*Primary Examiner* — Vishal A Patel
(74) *Attorney, Agent, or Firm* — Harness, Dickey & Pierce, P.L.C.

(57) ABSTRACT

A sealing device has a seal ring, a first backup ring and a second backup ring. The first backup ring is formed into a triangular cross section while having an axially vertical end surface portion, a cylindrical peripheral surface portion, and an inclined surface portion intersecting the end surface portion and the peripheral surface portion. The second backup ring is formed into a triangular cross section while having an axially vertical end surface portion, a cylindrical peripheral surface portion, and an inclined surface portion in correspondence to the inclined surface portion of the first backup ring. A cut portion is provided in a corner portion where the end surface portion and the inclined surface portion in the first backup ring intersect, and a corner portion where the peripheral surface portion and the inclined surface portion in the second backup ring intersect.

10 Claims, 4 Drawing Sheets

(51) Int. Cl.
*F16J 15/26* (2006.01)
*F02M 55/00* (2006.01)
*F16J 15/3216* (2016.01)
*F16J 15/3224* (2016.01)

(56) References Cited

U.S. PATENT DOCUMENTS

| | | | | |
|---|---|---|---|---|
| 4,231,578 A | * | 11/1980 | Traub | F16F 9/363 |
| | | | | 277/572 |
| 4,268,045 A | * | 5/1981 | Traub | F16F 9/363 |
| | | | | 277/589 |
| 6,502,826 B1 | * | 1/2003 | Schroeder | F16J 9/06 |
| | | | | 277/468 |
| 7,111,641 B2 | * | 9/2006 | Marban | F16L 37/28 |
| | | | | 137/614.03 |
| 9,109,703 B2 | * | 8/2015 | Dietle | F16J 15/166 |
| 9,388,901 B2 | * | 7/2016 | Nuennerich | F16J 13/02 |

FOREIGN PATENT DOCUMENTS

| | | |
|---|---|---|
| JP | 2002161983 A | 6/2002 |
| JP | 2004225778 A | 8/2004 |
| JP | 2013119884 A | 6/2013 |

\* cited by examiner

SEALING DEVICE

CROSS-REFERENCE TO RELATED APPLICATIONS

This application is a U.S. National Phase Application under 35 U.S.C. 371 of International Application No. PCT/JP2015/056600, filed on Mar. 6, 2015 and published in Japanese as WO2015/133595 on Sep. 11, 2015. This application claims priority to Japanese Patent Application No. 2014-043578, filed on Mar. 6, 2014. The entire disclosures of the above applications are incorporated herein by reference.

BACKGROUND OF THE INVENTION

Field of the Invention

The present invention relates to a sealing device according to a seal technique. The sealing device according to the present invention is particularly suitable for being used as a high-pressure seal.

Description of the Conventional Art

There has been conventionally known a sealing device 1 shown in FIG. 4A as a high-pressure seal. The sealing device 1 is adapted to seal so as to prevent a sealed fluid in a high-pressure side H from leaking to a low-pressure side L by being arranged between two members 51 and 52 facing to each other, and is combined by a seal ring 11 which is installed to an installation groove 53 provided in one member 51 of these two members 51 and 52 and comes into close contact with the other member 52, a first backup ring 21 which is arranged in an opposite side (the low-pressure side L) to the sealed fluid in the seal ring 11 and is comparatively hard, and a second backup ring 31 which is arranged between the seal ring 11 and the first backup ring 21 and is comparatively soft.

The installation groove 53 is formed into a groove having a rectangular cross section for being easily processed. The first backup ring 21 is provided with an end surface portion 21a which comes into contact with a side surface portion 53b in an opposite side to the sealed fluid in the installation groove 53 and is formed into an axially vertical plane, a peripheral surface portion 21b which comes into contact with the other member 52 and is formed into a cylindrical surface, and an inclined surface portion 21c which intersects the end surface portion 21a and the peripheral surface portion 21b, and is formed into a triangular cross section. The second backup ring 31 is provided with an end surface portion 31a which is brought into contact with the seal ring 11 and is formed into an axially vertical surface, a peripheral surface portion 31b which comes into contact with a bottom surface portion 53a of the installation groove 53 and is formed into a cylindrical surface, and an inclined surface portion 31c which is provided in correspondence to the inclined surface portion 21c of the first backup ring 21, and is formed into a triangular cross section in the same manner.

In the sealing device 1 having the structure mentioned above, since the first backup ring 21 is arranged in the opposite side (the low-pressure side L) to the sealed fluid in the seal ring 11, the seal ring 11 can be prevented from breaking by protruding to a gap 54 between two members 51 and 52. Further, since the second backup ring 31 is arranged between the seal ring 11 and the first backup ring 21, the seal ring 11 can be prevented from breaking by protruding to a gap (not shown) between the first backup ring 21 and the other member 52.

However, in the sealing device 1, since a corner portion 21d, where the end surface portion 21a and the inclined surface portion 21c in the first backup ring 21 intersect, is formed into a pointed shape, and a corner portion 31d, where the peripheral surface portion 31b and the inclined surface portion 31c in the second backup ring 31 intersect, is also formed into a pointed shape, the following problems are pointed out.

More specifically, when two members 51 and 52 are decentered each other as shown in FIG. 4B, the corner portion 21d having the pointed shape in the first backup ring 21 interferes with the bottom surface portion 53a of the installation groove 53 at a portion C on the drawing which is circumferentially a part, and is collapsed. Therefore, since the comparatively hard first backup ring 21 is collapsed as mentioned above, a breakage such as a crack may be generated in the first backup ring 21. Since the corner portion 21d is positioned in an inner corner portion where the bottom surface portion 53a and the side surface portion 53b intersect in the installation groove 53, the corner portion 21d has no way out even if it is exposed to a load. Therefore, the corner portion 21d tends to be collapsed and be broken (a first problem due to interference).

Further, when two members 51 and 52 are decentered each other as shown in FIG. 4B, the corner portion 31d having the pointed shape in the second backup ring 31 interferes with the side surface portion 53b of the installation groove 53 at a portion D on the drawing which is circumferentially a part, and is collapsed in the same manner. Further, since the second backup ring 31 is comparatively soft, the breakage such as the crack is not generated. However, since the collapsed corner portion 31d has no way out, the corner portion 31d is pressed to the first backup ring 21. As a result, a gap is generated in relation to the first backup ring 21 and the second backup ring 31 is inclined. Therefore, a gap (not shown) is generated between the second backup ring 31 and the bottom surface portion 53a of the installation groove 53, and the seal ring may protrude to the gap and break (a second problem due to interference).

SUMMARY OF THE INVENTION

Problem to be Solved by the Invention

The present invention is made by taking the above points into consideration, and an object of the present invention is to provide a sealing device constructed by a combination of a seal ring which is installed to an installation groove having a rectangular cross sectional shape, a first backup ring and a second backup ring, wherein the sealing device can inhibit problems due to interference from being generated in the backup rings having a triangular cross sectional shape.

Means for Solving the Problem

In order to achieve the object mentioned above, a sealing device according to claim 1 of the present invention is a sealing device arranged between two members facing to each other and sealing a sealed fluid, the sealing device comprising a seal ring which is installed to an installation groove provided in one member of the two members and comes into close contact with the other member, a first backup ring which is arranged in an opposite side to the sealed fluid in the seal ring and is comparatively hard, and a second backup ring which is arranged between the seal ring and the first backup ring and is comparatively soft, wherein the installation groove is formed into groove having a rectangular cross sectional shape, the first backup ring is provided with an end surface portion which comes into contact with a side surface portion in an opposite side to the sealed fluid in the installation groove and is formed into an axially vertical surface, a peripheral surface portion which comes into contact with the other member and is formed into a cylindrical surface, and an inclined surface portion which intersects the end surface portion and the peripheral surface portion, and is formed into a triangular cross section, the second backup ring is provided with an end surface portion which is brought into contact with the seal ring and is formed into an axially vertical surface, a peripheral surface portion which comes into contact with a bottom surface portion of the installation groove and is formed into a cylindrical surface, and an inclined surface portion which is provided in correspondence to the inclined surface portion of the first backup ring, and is formed into a triangular cross section, a cut portion is provided in a corner portion where the end surface portion and the inclined surface portion in the first backup ring intersect, and a cut portion is provided in a corner portion where the peripheral surface portion and the inclined surface portion in the second backup ring intersect.

Further, a sealing device according to claim 2 of the present invention is the sealing device described in claim 1 mentioned above, wherein the cut portion provided in the first backup ring is cut in a direction which is parallel to a center axis of the first backup ring, and the cut portion provided in the second backup ring is cut in a direction which is orthogonal to a center axis of the second backup ring.

Further, a sealing device according to claim 3 of the present invention is the sealing device described in claim 1 or 2 mentioned above, wherein an axial width y of the cut portion in the first backup ring is set to a magnitude which is 0.2 to 2.5 times an amount of eccentricity between the two members.

Further, a sealing device according to claim 4 of the present invention is the sealing device described in claim 3 mentioned above, wherein the amount of eccentricity between the two members is equal to a diametrical gap between the two members.

In the sealing device according to the present invention having the structure mentioned above, the cut portion is provided in the corner portion where the end surface portion and the inclined surface portion in the first backup ring having the triangular cross sectional shape intersect. As a result, even if two members are eccentric each other, a matter that the corner portion interferes with the bottom surface portion of the installation groove and is collapsed is not generated. Further, since the cut portion is also provided in the corner portion where the peripheral surface portion and the inclined surface portion in the second backup ring having the triangular cross sectional shape intersect, a matter that the corner portion interferes with the side surface portion of the installation groove and is collapsed is not generated, even if two members are eccentric each other. Therefore, since an interference is hard to be generated in these backup rings, it is possible to inhibit the problem due to the interference from being generated.

The cutting direction in the cut portion is not particularly limited, and the cut portion may be formed into a linear shape or a curved shape in its cross section. However, in the case that the cut portion provided in the first backup ring is cut in the direction which is parallel to the center axis of the first backup ring, the cut portion is formed into a linear shape in its cross section and is formed into a cylindrical surface shape. Further, in the case that the cut portion provided in the second backup ring is cut in the direction which is orthogonal to the center axis of the second backup ring, the cut portion is formed into a liner shape in its cross section and is formed into an axially vertical surface shape. The cut portions having the above shapes are all easily processed, and easily manufacture the backup ring.

Effect of the Invention

The present invention achieves the following effects.

More specifically, in the present invention, the cut portion is provided in the corner portion where the end surface portion and the inclined surface portion in the first backup ring having the triangular cross sectional shape intersect, as mentioned above. As a result, even if two members are eccentric each other, a matter that the corner portion interferes with the bottom surface portion of the installation groove and is collapsed is not generated. Therefore, it is possible to inhibit the breakage such as the crack from being generated in the comparatively hard first backup ring due to the collapse of the corner portion. Further, since the cut portion is also provided in the corner portion where the peripheral surface portion and the inclined surface portion in the second backup ring having the triangular cross sectional shape intersect, a matter that the corner portion interferes with the side surface portion of the installation groove and is collapsed is not generated, even if two members are eccentric each other. Therefore, it is possible to inhibit a great incline from being generated in the comparatively soft second backup ring due to the collapse of the corner portion, inhibit the gap from being generated between the second backup ring and the bottom surface portion of the installation groove, and inhibit the seal ring from protruding to the gap and breaking.

Further, the backup ring parts which are easily process and manufactured can be provided by cutting the cut portion provided in the first backup ring in the direction which is parallel to the direction of the center axis of the first backup ring, and cutting the cut portion provided in the second backup ring in the direction which is orthogonal to the direction of the center axis of the second backup ring.

DETAILED DESCRIPTION OF PREFERRED EMBODIMENT

Next, a description will be given of an embodiment according to the present invention with reference to the accompanying drawings.

Figure 1A:
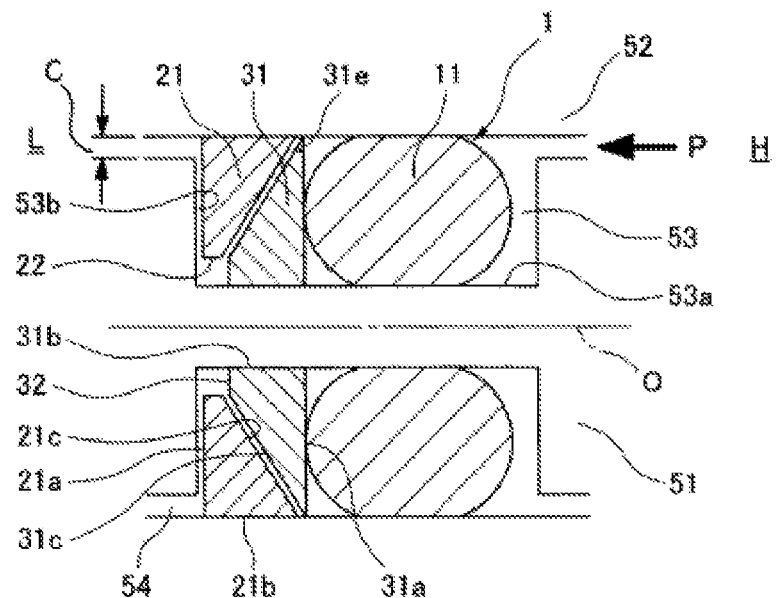
FIG. 1A is a cross sectional view of a sealing device according to an embodiment of the present invention.

FIG. 1A shows a cross section of a substantial part of a sealing device 1 according to an embodiment of the present invention. The sealing device 1 according to the embodiment is used in a high-pressure seal portion in a hydraulic device such as an injector, and is structured as follows.

More specifically, the sealing device 1 is arranged in an annular gap between a shaft 51 and a housing 52 which correspond to two members facing to each other, and is adapted to seal a sealed fluid existing in a high-pressure side H in a right direction of the drawing so as to prevent the sealed fluid from leaking to a low-pressure side (an atmospheric air side) B in a left direction of the drawing. The sealing device 1 has an O-ring 11 serving as a seal ring which is installed to an annular installation groove 53 provided in a peripheral surface of the shaft 51 and comes into close contact with an inner peripheral surface of a shaft hole of the housing 52, a first backup ring 21 which is arranged in an opposite side (a low-pressure side L) to the sealed fluid in the O-ring 11 and is installed to the installation groove 53 in the same manner, and a second backup ring 31 which is arranged between the O-ring 11 and the first backup ring 21 and is installed to the installation groove 53 in the same manner. The O-ring 11 may be replaced by a seal ring having the other cross sectional shape such as a D-ring and an X-ring.

The O-ring 11 is formed by a rubber-like elastic material. The first backup ring 21 is formed by a material, for example, a nylon resin which is harder than the second backup ring 31. The second backup ring 31 is formed by a material, for example, a PTFE resin which is softer than the first backup ring 21.

The installation groove 53 is formed into a rectangular groove having a rectangular cross section since it is easily processed. Therefore, anything having a taper shape is not provided within the groove, but the installation groove 53 is combined only by a bottom surface portion 53a having a cylindrical surface shape, and both side surface portions 53b having an axially vertical surface shape.

The first backup ring 21 is provided with an end surface portion 21a which comes into contact with the side surface portion 53b of the installation groove 53, is provided in an opposite side (a low-pressure side L) to the sealed fluid and is formed into an axially vertical surface, a peripheral surface portion 21b which comes into contact with an inner peripheral surface of a shaft hole of the housing 52, is provided in an outer peripheral side and is formed into a cylindrical surface, and an inclined surface portion 21c which intersects the end surface portion 21a and the peripheral surface portion 21b and is formed into a taper surface, and is formed into a triangular cross section (a right angled triangle). The inclined surface portion 21c is formed into a linear cross section, and its taper direction is set to a direction by which a diameter is reduced little by little from the sealed fluid side (the high-pressure side H) toward the opposite side (the low-pressure side L) to the sealed fluid.

The second backup ring 31 is provided with an end surface portion 31a which is brought into contact with the seal ring 11, is provided in the sealed fluid side (a high-pressure side H) and is formed into an axially vertical surface, a peripheral surface portion 31b which comes into contact with the bottom surface portion 53a of the installation groove 53, is provided in an inner peripheral side and is formed into a cylindrical surface, and an inclined surface portion 31c which intersects the end surface portion 31a and the peripheral surface portion 31b and is formed into a taper surface, and is formed into a triangular cross section (a right angled triangle). The inclined surface portion 31c is formed into a linear cross section, and its taper direction is set to a direction by which a diameter is reduced little by little from the sealed fluid side (the high-pressure side H) toward the opposite side (the low-pressure side L) to the sealed fluid.

The inclined surface portion 21c of the first backup ring 21 and the inclined surface portion 31c of the second backup ring 31 are provided in correspondence to each other, and are formed in such a manner that their angle of incline, length of inclined surface, maximum outer diameter and minimum inner diameter are equal or approximately equal.

Further, a cut portion 22 is provided in a corner portion where the end surface portion 21a and the inclined surface portion 21c in the first backup ring 21 intersect. The cut portion 22 is cut in a direction which is parallel to a direction of a center axis O of the first backup ring 21 as well as being formed into an annular shape. As a result, the cut portion 22 is formed into a cylindrical surface. A diameter of the cut portion 22 is formed to be larger than a diameter of the bottom surface portion 53a in the installation groove 53.

Further, a cut portion 32 is provided in a corner portion where the peripheral surface portion 31b and the inclined surface portion 31c in the second backup ring 31 intersect. The cut portion 32 is cut in a direction which is orthogonal to a direction of a center axis O of the second backup ring 31 as well as being formed into an annular shape. As a result, the cut portion 32 is formed into an axially vertical surface.

In the sealing device 1 having the structure mentioned above, it is possible to prevent the seal ring 11 from protruding to the gap 54 between the shaft 51 and the housing 52 and breaking since the first backup ring 21 is arranged in the opposite side (the low-pressure side L) to the sealed fluid in the seal ring 11. Further, it is possible to prevent the seal ring 11 from protruding to the gap (not shown) between the first backup ring 21 and the housing 52 and breaking since the second backup ring 31 is arranged between the seal ring 11 and the first backup ring 21.

Figure 1B:
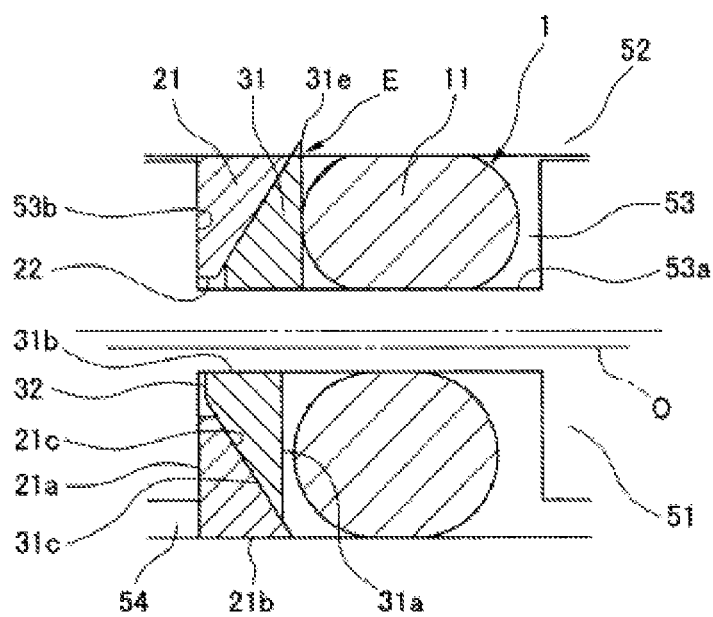
FIG. 1B is a cross sectional view showing a state in which the sealing device is eccentric.

Further, since the cut portion 22 is provided in the corner portion where the end surface portion 21a and the inclined surface portion 21c in the first backup ring 21 having the triangular cross sectional shape intersect, the corner portion is not collapsed by the interference with the bottom surface portion 53a of the installation groove 53 even if the shaft 51 and the housing 52 are decentered each other as shown in FIG. 1B. Therefore, it is possible to inhibit the breakage such as a crack from being generated in the first backup ring 21 which is comparatively hard, due to the collapse of the corner portion.

Further, since the cut portion 32 is provided in the corner portion where the peripheral surface portion 31b and the inclined surface portion 31c in the second backup ring 31 having the triangular cross sectional shape intersect, the corner portion is not collapsed by the interference with the side surface portion 53b of the installation groove 53 even if the shaft 51 and the housing 52 are decentered each other as shown in FIG. 1B. Therefore, it is possible to inhibit a great incline from being generated in the second backup ring 31 which is comparatively soft due to the collapse of the corner portion, inhibit the gap from being generated between the second backup ring 31 and the bottom surface portion 53a of the installation groove 53, and inhibit the seal ring 11 from protruding to the gap and breaking.

Further, since the cut portion 22 provided in the first backup ring 21 is cut in the direction which is parallel to the direction of the center axis O of the first backup ring 21, the first backup ring 21 is simple in its shape, and is easily processed and manufactured. Further, since the cut portion 32 provided in the second backup ring 31 is cut in the direction which is orthogonal to the direction of the center axis O of the second backup ring 31, the second backup ring 31 is also simple in its shape, and is easily processed and manufactured. Therefore, it is possible to provide a backup ring part which is easily processed and manufactured while having the cut portions 22 and 32.

In the embodiment, any cut portion is not provided in a corner portion 31e where the end surface portion 31a and the inclined surface portion 31c in the second backup ring 31 intersect as shown by a portion E in FIG. 1B. As a result, the corner portion 31e is formed into a pointed shape, and interferes with the inner peripheral surface of the shaft hole of the housing 52 when the shaft 51 and the housing 52 are eccentric each other. However, the sealed fluid side (the high-pressure side H) of the corner portion 31e is a space and a way out is secured here. Therefore, any cut portion is not necessarily provided in the corner portion 31e, and provision of no cut portion tends to inhibit the seal ring 11 from protruding.

With regard to the cut portion 22 provided in the first backup ring 21, the axial width y thereof is preferably set to be 0.2 to 2.5 times an amount of eccentricity between two members (the shaft 51 and the housing 52). This is because of the following reasons.

Figure 2:
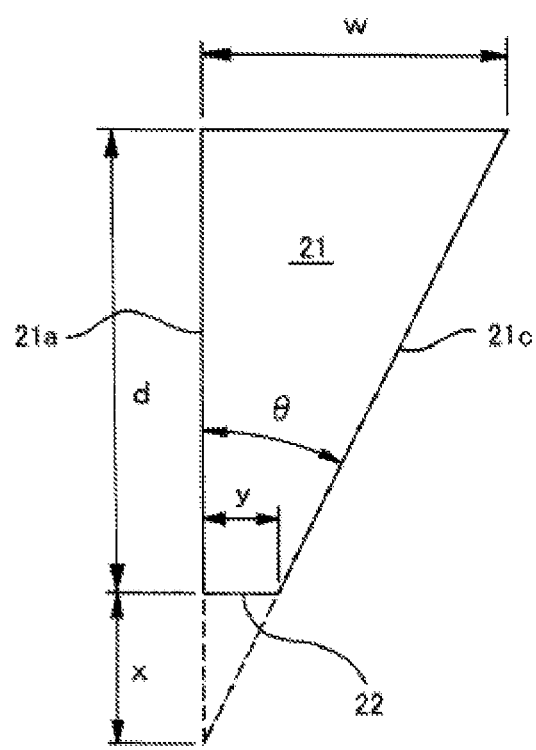
FIG. 2 is an explanatory view showing a cross sectional shape of a first backup ring which is provided in the sealing device.

More specifically, as shown in FIG. 2, a diametrical width d of the first backup ring 21 is frequently set to 1 to 4 mm in an actual dimension and an axial width w of the first backup ring 21 is frequently set to 1 to 2 mm correspondingly, in the case that the sealing device 1 according to the present invention is used as a seal for injector. Further, an angle θ formed by the end surface portion 21a and the inclined surface portion 21c at this time is within a range between 14 degrees and 65 degrees. Since the present invention is structured such that the cut portion 22 corresponding to the amount of eccentricity is provided in the corner portion where the end surface portion 21a and the inclined surface portion 21c in the first backup ring 21 intersect, the axial width y is determined by the following expression, on the assumption that the diametrical width of the cut portion 22 is x and the axial width of the cut portion 22 is y.

$$y = x \times \tan \theta$$

Here, $y=(0.25$ to $2.14) \times x$ since $\theta=14$ degrees to 65 degrees as mentioned above.

As a result of addition of dimensional tolerance to a numerical value width between 0.25 and 2.14, the axial width y of the cut portion 22 provided in the first backup ring 21 is preferably set to a magnitude between 0.2 and 2.5 times the amount of eccentricity between two members.

Further, with regard to the amount of eccentricity between two members (the shaft 51 and the housing 52), since the diametrical gap c (refer to FIG. 1A) between two members is the maximum value when two members are positioned coaxially, the diametrical gap c between two members is set to the amount of eccentricity (the maximum amount of eccentricity) between two members.

Further, in the embodiment, the inclined surface portion 21c of the first backup ring 21 and the inclined surface portion 31c of the second backup ring 31 are both formed into the taper surface having the linear cross sectional shape where the angles of incline are fixed. However, the inclined surface portions 21c and 31c may be formed into a taper surface having a curved cross sectional shape where angles of incline change little by little.

Figure 3:
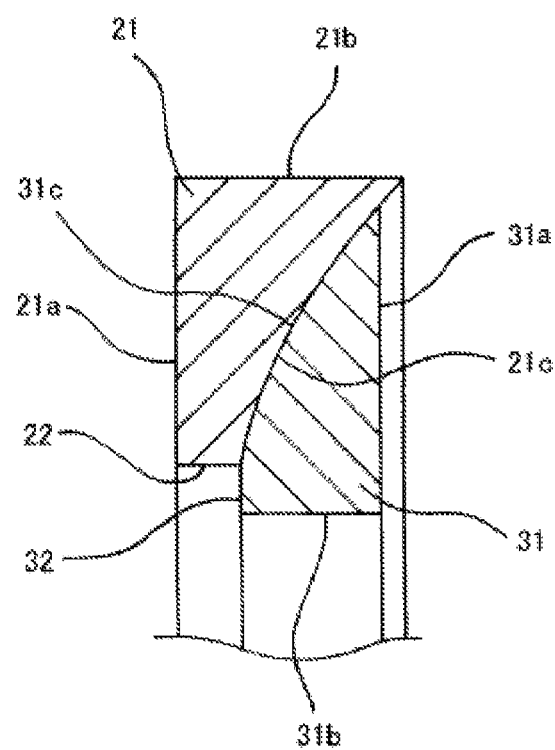
FIG. 3 is an explanatory view showing the other example of the cross sectional shapes of the first backup ring and a second backup ring which are provided in the sealing device.
Figure 4A:
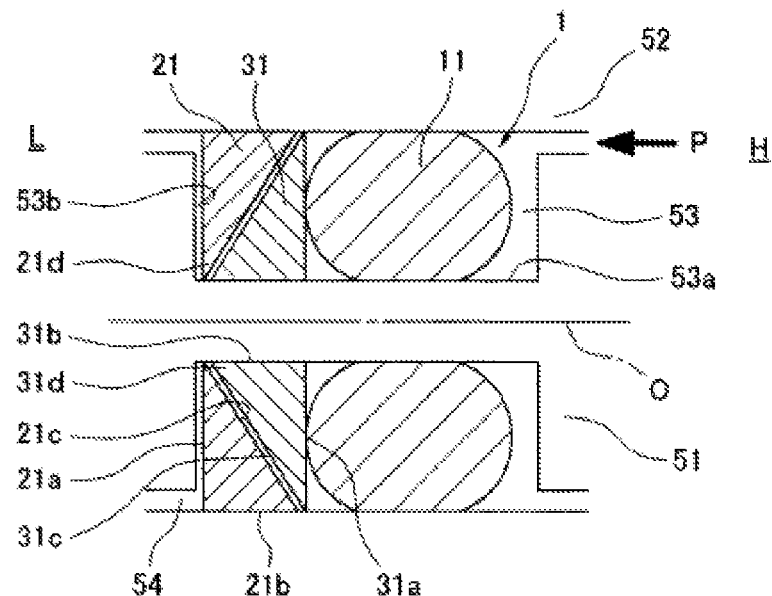
FIG. 4A is a cross sectional view of a sealing device according to the conventional art.
Figure 4B:
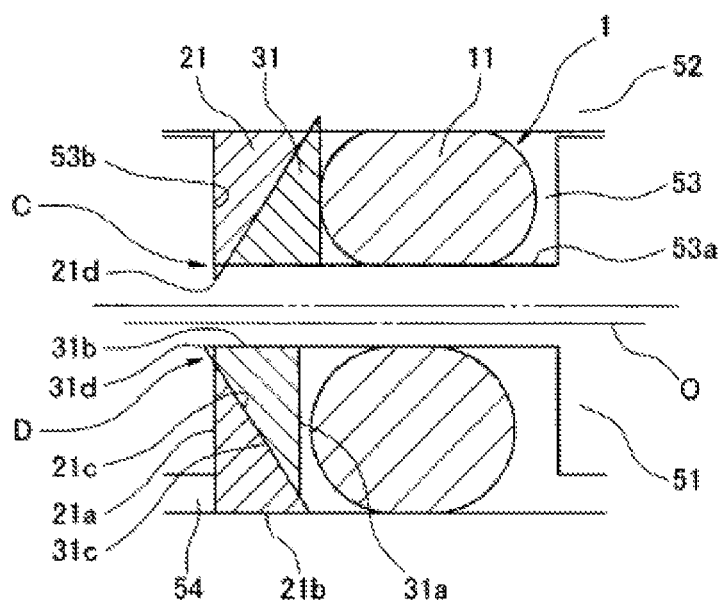
FIG. 4B is a cross sectional view of a state in which the sealing device is eccentric.

As an example in this case, the inclined surface portion 21c of the first backup ring 21 is formed into a taper surface having a curved cross sectional shape where an angle of incline becomes smaller little by little from an inner diameter side toward an outer diameter side, and the inclined surface portion 31c of the second backup ring 31 is correspondingly formed into a taper surface having a curved cross sectional shape where an angle of incline becomes smaller little by little from an inner diameter side toward an outer diameter side in the same manner, in an example shown in FIG. 3.

What is claimed is:
1. A sealing device arranged between two members facing to each other and sealing a sealed fluid,
wherein the sealing device comprises a seal ring which is installed to an installation groove provided in one member of the two members and comes into close contact with the other member, a first backup ring which is arranged in an opposite side to the sealed fluid in the seal ring, and a second backup ring which is arranged between the seal ring and the first backup ring,
wherein the installation groove has a rectangular cross sectional shape,
wherein the first backup ring is provided with an end surface portion which comes into contact with a side surface portion in an opposite side to the sealed fluid in the installation groove and is formed into an axially vertical surface, a peripheral surface portion which comes into contact with the other member and is formed into a cylindrical surface, and an inclined surface portion which intersects the end surface portion and the peripheral surface portion, the first backup ring having trapezoidal cross section, and a first acute angle is formed at a location where the peripheral surface portion of the first backup ring intersects the inclined surface portion of the first backup ring, which forms a first apex,
wherein the second backup ring is provided with an end surface portion which is brought into contact with the seal ring and is formed into an axially vertical surface, a peripheral surface portion which comes into contact with a bottom surface portion of the installation groove and is formed into a cylindrical surface, and an inclined surface portion which is provided in correspondence to the inclined surface portion of the first backup ring, the second backup ring having a trapezoidal cross section, and a second acute angle is formed at a location where the end surface portion of the second backup ring intersects the inclined surface portion of the second backup ring, which forms a second apex,
wherein the end surface portion and the inclined surface portion of the first backup ring are connected by a first surface that is parallel to the peripheral surface portion of the first backup ring, the first surface having a length that is less than that of the peripheral surface portion of the first backup ring, and
wherein the peripheral surface portion and the inclined surface portion of the second backup ring are connected by a second surface that is parallel to the end surface portion of the second backup ring, the second surface having a length that is less than that of the end surface portion of the second backup ring.
2. The sealing device according to claim 1, wherein the first surface is parallel to a center axis of the first backup ring, and
wherein the second surface is orthogonal to a center axis of the second backup ring.

3. The sealing device according to claim 1, wherein an axial width y of the first surface is set to a magnitude that is 0.2 to 2.5 times an amount of eccentricity between the two members.

4. The sealing device according to claim 3, wherein the amount of eccentricity between the two members is equal to a diametrical gap c between the two members.

5. The sealing device according to claim 2, wherein an axial width y of the first surface is set to a magnitude which is 0.2 to 2.5 times an amount of eccentricity between the two members.

6. The sealing device according to claim 1, wherein first backup ring is rigid, and the second backup ring is less rigid than the first backup ring.

7. A sealing device arranged between two members facing to each other and sealing a sealed fluid,
wherein the sealing device comprises a seal ring which is installed to an installation groove provided in one member of the two members and comes into close contact with the other member, a first backup ring which is arranged in an opposite side to the sealed fluid in the seal ring, and a second backup ring which is arranged between the seal ring and the first backup ring,
wherein the installation groove has a rectangular cross sectional shape,
wherein the first backup ring is provided with an end surface portion which comes into contact with a side surface portion in an opposite side to the sealed fluid in the installation groove and is formed into an axially vertical surface, a peripheral surface portion which comes into contact with the other member and is formed into a cylindrical surface, and an inclined surface portion which intersects the end surface portion and the peripheral surface portion, the first backup ring having trapezoidal cross section, and a first acute angle is formed at a location where the peripheral surface portion of the first backup ring intersects the inclined surface portion of the first backup ring, which forms a first apex,
wherein the second backup ring is provided with an end surface portion which is brought into contact with the seal ring and is formed into an axially vertical surface, a peripheral surface portion which comes into contact with a bottom surface portion of the installation groove and is formed into a cylindrical surface, and an inclined surface portion which is provided in correspondence to the inclined surface portion of the first backup ring, the second backup ring having a trapezoidal cross section, and a second acute angle is formed at a location where the end surface portion of the second backup ring intersects the inclined surface portion of the second backup ring, which forms a second apex,
wherein the end surface portion and the inclined surface portion of the first backup ring are connected by a first surface that is parallel to the peripheral surface portion of the first backup ring, the first surface having a length that is less than that of the peripheral surface portion of the first backup ring,
wherein the peripheral surface portion and the inclined surface portion of the second backup ring are connected by a second surface that is parallel to the end surface portion of the second backup ring, the second surface having a length that is less than that of the end surface portion of the second backup ring, and
wherein the first surface is spaced apart from the bottom surface portion of the installation groove.

8. The sealing device according to claim 7, wherein first backup ring is rigid, and the second backup ring is less rigid than the first backup ring.

9. The sealing device according to claim 7, wherein the first surface is parallel to a center axis of the first backup ring, and
wherein the second surface is orthogonal to a center axis of the second backup ring.

10. The sealing device according to claim 7, wherein an axial width y of the first surface is set to a magnitude that is 0.2 to 2.5 times an amount of eccentricity between the two members.

* * * * *